(12) United States Patent
Nelson

(10) Patent No.: US 6,838,796 B1
(45) Date of Patent: Jan. 4, 2005

(54) TWO-SPEED ROTATIONAL CONTROL APPARATUS WITH EDDY CURRENT DRIVE

(75) Inventor: Chris A. Nelson, Bloomington, MN (US)

(73) Assignee: Horton, Inc., Roseville, MN (US)

( * ) Notice: Subject to any disclaimer, the term of this patent is extended or adjusted under 35 U.S.C. 154(b) by 0 days.

(21) Appl. No.: 10/634,372

(22) Filed: Aug. 5, 2003

(51) Int. Cl.$^7$ .............................................. H02K 49/04
(52) U.S. Cl. ..................................... 310/105; 192/84.3
(58) Field of Search .............................. 192/84.1, 84.3, 192/85 A; 310/105

(56) References Cited

U.S. PATENT DOCUMENTS

| | | | | |
|---|---|---|---|---|
| 5,059,161 A | * | 10/1991 | Bredt | 475/269 |
| 5,586,636 A | * | 12/1996 | Linnig | 192/48.2 |
| 5,611,415 A | | 3/1997 | Davis et al. | 192/18 A |
| 5,613,586 A | | 3/1997 | Schilling et al. | 192/48.3 |
| 5,636,719 A | * | 6/1997 | Davis et al. | 192/18 A |
| 5,994,810 A | | 11/1999 | Davis et al. | 310/105 |
| 6,092,638 A | | 7/2000 | Vatsaas | 192/85 A |
| 6,109,871 A | * | 8/2000 | Nelson et al. | 416/36 |
| 6,548,929 B2 | | 4/2003 | Nelson et al. | 310/101.5 |

* cited by examiner

Primary Examiner—Burton Mullins
(74) Attorney, Agent, or Firm—Kinney & Lange, P.A.

(57) ABSTRACT

A rotational control apparatus includes a first rotatable assembly and a second rotatable assembly. The first assembly is rotatably mounted to a first support mount. The second assembly is rotatably mounted to the first assembly and is axially moveable relative to the first assembly. The first and second assemblies have respective coaxial surfaces adjacent to and spaced from one another and further have respective axial surfaces that frictionally engage one another when the second assembly is in a first axial position and disengage when the second assembly is in a second axial position. The second assembly is capable of rotation independent of the first assembly when the second assembly is in the second axial position. The rotational control apparatus includes an eddy current drive comprised of a first eddy current coupling assembly associated with the coaxial surface of the first assembly and a second eddy current coupling assembly associated with the coaxial surface of the second assembly, the second eddy current coupling assembly adjacent the first eddy current coupling assembly with an air gap therebetween.

29 Claims, 5 Drawing Sheets

TWO-SPEED ROTATIONAL CONTROL APPARATUS WITH EDDY CURRENT DRIVE

CROSS-REFERENCE TO RELATED APPLICATION(S)

None.

BACKGROUND OF THE INVENTION

The present invention relates to a rotational control apparatus and more particularly to an eddy current fan drive system operable to drive a cooling fan with multiple speed control.

In a typical eddy current drive, a first magnetic field producing drive component, such as in the form of permanent magnets, is mounted for rotation with either the input or output of a rotational control apparatus, such as a clutch, for magnetically coupling with a second coupling drive component mounted for rotation with either the input or output. The second coupling drive component was typically in the form of a first ring formed of electrically conductive material, such as copper, sandwiching a second ring of magnetic flux conductive material, such as steel, against a mounting body portion formed of heat conductive material, such as aluminum, so that the body portion acts as a heat sink. Screws extend through the first and second rings and are threaded into the body portion.

These coupling drive components suffered from various problems and deficiencies. The mechanical attachment of the steel and copper rings to the body portion increases the number of components and assembly required and is subject to loosening and/or separating and thereby detrimentally affecting reliability. Also, the first and second drive components are bearing mounted and fixed close to a fan. The first and second drive components are axially arranged face to face with a fixed gap; there is no relative axial movement between the drive components. Such an arrangement provides two speed fan drives. Current two speed cooling fan customers require more drive torque to rotate larger fans and to rotate fans at higher speeds. Current eddy current drive systems used to operate cooling fans do not have the torque capacity to handle these applications.

Fan drives exist that can handle the torque required by larger fan applications, however, these fan drives do not include a desired second intermediate speed. One fan clutch that has a large torque capacity is disclosed in U.S. Pat. No. 6,092,638, entitled "Splineless Rotational Control Apparatus" and assigned to Horton, Inc. (the assignee of the present application).

The fan clutch includes an actuation system to apply an axial load on a coupling element. The actuation system is generally constituted of either one of the rotatable components or a separate part, to create some relative axial movement between the coupling elements and fan mounted friction disc (FMFD) (one of the rotatable components) to drivingly interconnect the two rotatable components. Typically, the coupling element is an annular piston which is acted upon by at least one spring to bias the piston toward an activated or a deactivated position and move the FMFD.

In a typical axially arranged eddy current fan drive there is a fixed gap because the two assemblies that create the eddy current coupling are bearing mounted and fixed to the journal shaft. The eddy current drive may be adapted to a large torque capacity fan clutch to allow relative axial movement between the two assemblies. In the axially actuated fan clutch the magnet poles of the eddy current assembly lie along a line parallel to the central axis and located at a fixed radial distance from the axis. The eddy current assembly includes a non-magnetic material with an axially adjacent magnetic material which is axially spaced from the magnets by an air gap. The air gap between the two assemblies is not fixed because the FMFD moves axially and the two eddy current coupling assemblies move axially relative to one another. Thus, an eddy current coupling is needed that maintains a constant gap while allowing axial relative movement between the two assemblies.

The axially actuated fan clutch is used to selectively control the transmission of rotational forces between first and second relatively rotatable members, and in particular to a frictional clutching device for driving a fan. The axially actuated fan clutch can handle the drive torque necessary to rotate larger fans and to rotate fans at higher speeds. However, the axially actuated fan clutch typically are one speed and drive the fan between an on and off position.

Eddy current drives typically produce torque producing eddy currents and non-torque producing eddy currents. When a non-torque producing eddy current is created (an eddy current which does not transmit torque) it is a loss, an inefficiency, and a source of increased heat within the drive. Eddy current drives utilizing a solid-iron back iron as the magnetic material produce the non-torque producing eddy currents. The elimination of non-torque producing eddy currents increases the inefficiency of the eddy current drive.

Thus, an eddy current drive is needed that eliminates the non-torque producing eddy currents, enhances the production of torque producing eddy currents (torque producing eddy currents which are desired to improve the torque capacity of the fan drive and operate the fan at higher speeds), and can handle the torque required to rotate larger fans, to rotate fans at higher speeds and to permit multiple, but fixed, speed operation.

BRIEF SUMMARY OF THE INVENTION

The present invention relates to a rotational control apparatus including a first rotatable assembly and a second rotatable assembly. The first assembly is rotatably mounted to a first shaft of a first support mount. The second assembly is rotatably mounted to the first assembly, wherein the second assembly is axially moveable relative to the first assembly. The first and second assemblies have respective coaxial surfaces adjacent to and spaced from one another. The first and second assemblies further have respective axial surfaces that frictionally engage one another when the second assembly is in a first axial position and disengage when the second assembly is in a second axial position. The second assembly is capable of rotation independent of the first assembly when the second assembly is in the second axial position. The rotational control apparatus includes an eddy current drive comprised of a first eddy current coupling assembly and a second eddy current coupling assembly. The first eddy current coupling assembly is associated with the coaxial surface of the first assembly and the second eddy current coupling assembly is associated with the coaxial surface of the second assembly wherein the second eddy current coupling assembly is adjacent the first eddy current assembly with an air gap therebetween.

In a further embodiment of the present invention, the second eddy current coupling assembly includes a plurality of coaxial electrically insulated rings arranged in an inner cavity of the second assembly and a non-magnetic ring coaxially positioned adjacent to the electrically insulated rings.

Another embodiment of the present invention relates to a rotational control apparatus including a support mount adapted to be maintained in the position fixed against rotation. A first rotatable assembly includes a first portion adapted to be interconnected to a driving source and a second portion axially spaced from the first portion, the second portion further including an outer circumferential surface. A first bearing unit is interposed between the support mount and the first rotatable assembly, with the first rotatable assembly being rotatably supported by the support mount through the first bearing unit. A first engagement surface is provided at the second portion of the first rotatable assembly for concurrent rotation with the first rotatable assembly. The rotational control apparatus includes a second rotatable assembly having first and second sections. The first section of the second rotatable assembly includes a radially extending portion defining an inner radial surface portion aligned with the outer circumferential surface of the first assembly and the inner radial surface portion defining an inner cavity of the second rotatable assembly. The second section of the second rotatable assembly extends radially inwardly from the first section and is axially spaced from the first portion of the first rotatable assembly. A second engagement surface is provided at the first section of the second rotatable assembly. A piston is positioned axially between the first portion of the first rotatable assembly and the second section of the second rotatable assembly, with the piston being axially moveable relative to the first rotatable assembly. The rotational control apparatus includes means for axially moving the piston relative to the first rotatable assembly to cause selective engagement between the first and second engagement surfaces in order to interconnect the first and second rotatable assemblies. A second bearing unit interconnects the piston and the second rotatable assembly for concurrent axial movement relative to the first rotatable assembly, permitting relative rotation between the piston and the second rotatable assembly. A first eddy current assembly is radially mounted to the outer radial surface portion of the second portion of the first rotatable assembly and a second eddy current assembly is radially mounted in the inner cavity of the second rotatable assembly. The second eddy current assembly is radially spaced from and coaxial to the first eddy current assembly. The second eddy current assembly includes a plurality of electrically insulated rings of material radially arranged in the inner cavity of the second rotatable assembly and an intermediate ring of non-magnetic material connected to one of the electrically insulated rings, the intermediate ring positioned between the plurality of electrically insulated rings and the first eddy current assembly.

BRIEF DESCRIPTION OF THE DRAWINGS

The present invention will be further explained with reference to the attached figures, wherein like structure is referred to by like numerals throughout the several views.

While the above-identified drawings figures set forth several embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION

Figure 1A:
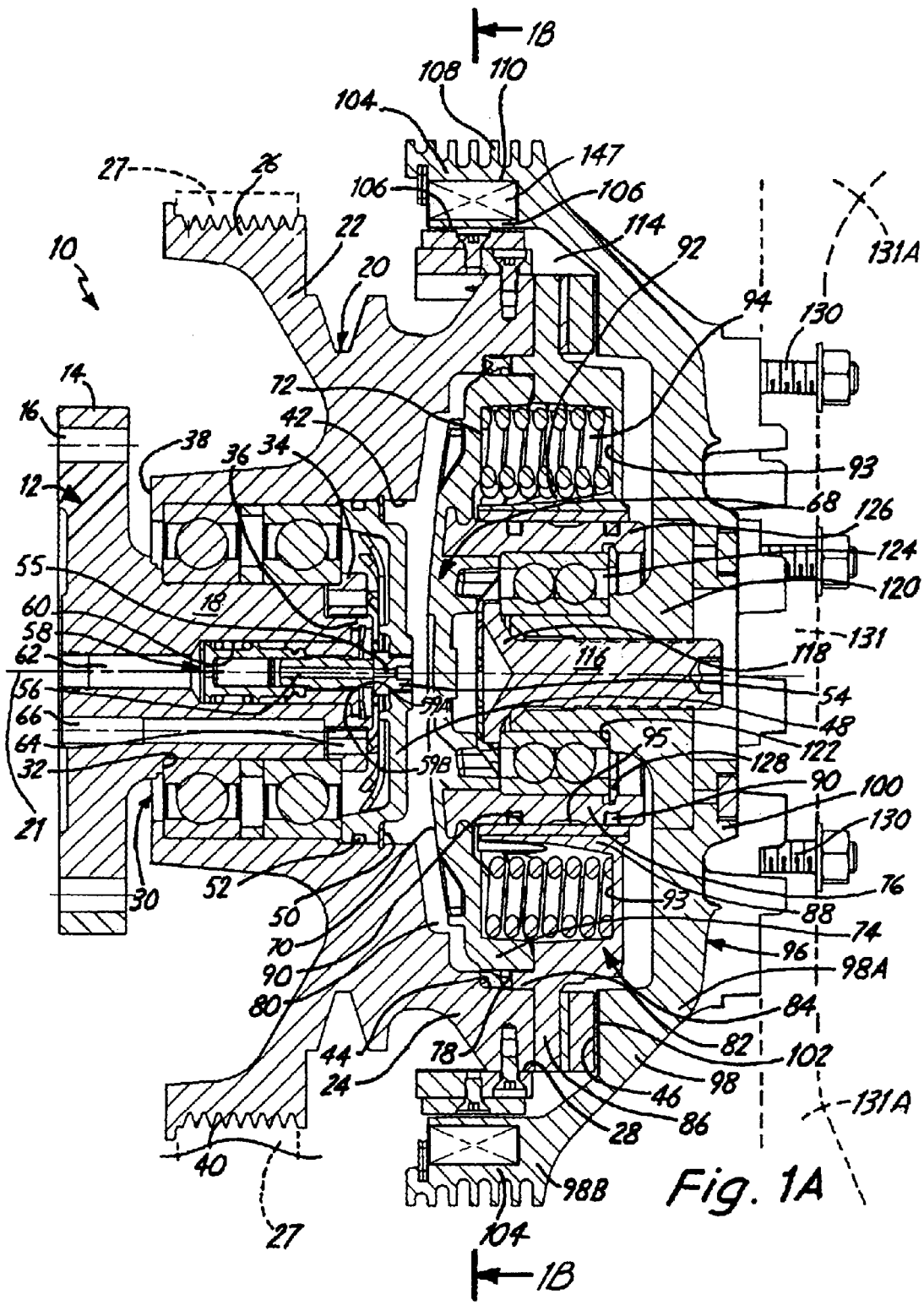
FIG. 1A is a cross-sectional view of a rotational control apparatus in accordance with a first embodiment of the present invention.

FIG. 1A is a cross sectional view of a rotational control apparatus 10 constructed in accordance with a first embodiment of the present invention. Rotational control apparatus 10 constitutes a friction clutch which is particularly adapted for use in driving a fan at multiple, fixed speeds, such as a cooling fan used in an automotive environment.

Rotational control apparatus 10 includes an integrally formed, support mount 12 for the overall apparatus. Support mount 12 is adapted to be maintained in a position fixed against rotation and includes a flange portion 14 through which a plurality of fasteners (not shown) received within apertures 16 for securing support mount 12 to a supporting structure (not shown), such as an engine block.

Support mount 12 includes a journal shaft 18 that is adapted to support a first rotatable assembly 20. First rotatable assembly 20 includes an axis 21. First rotatable assembly 20 is comprised of a first portion 22 and a second portion 24, axially spaced from first portion 22. First portion 22 of first rotatable assembly 20 includes an outer radial surface which defines a sheave 26 adapted to be coupled to a drive source (not shown) by a drive belt 27, and which constitutes a first or input member of rotational control apparatus 10. Second portion 24 includes an outer circumferential surface 28. First rotatable assembly 20 is rotatably supported upon journal shaft 18 by a first bearing unit 30. First bearing unit 30 is interposed between journal shaft 18 and sheave 26 of first rotatable assembly 20. First bearing unit 30 includes inner and outer races which are slip-fit upon journal shaft 18 and press-fit into first portion 22, respectively. The inner race(s) of first bearing unit 30 are axially fit upon journal shaft 18 by abutting a shoulder 32 of journal shaft 18 at one axial position and, at a spaced axial position, through engagement with a retainer element 34 which is attached to a reduced diametric, inner axial end 36 of journal shaft 18.

Sheave 26 of first portion 22 is provided with a proximal shoulder 38 which axially locates sheave 26 relative to first bearing unit 30. In the embodiment shown, shoulder 38 represents a proximal extension (toward the engine block) of first portion 22 of first rotatable assembly 20. Sheave 26 defines an outer radial grooved section 40 about which the belt 27 is adapted to extend for inputting a rotational drive force to sheave 26. First rotatable assembly 20 has associated therewith a first inner circumferential surface 42 and a second, larger inner circumferential surface 44, both of which are located within the confines of first rotatable assembly 20. Furthermore, second portion 24 of first rotatable assembly 20 further includes a first engagement surface 46 for concurrent rotation with first rotatable assembly 20.

In one embodiment of the invention, rotational control apparatus 10 constitutes a fluid pressure controlled device. In the embodiment shown in FIG. 1A, rotational control apparatus 10 incorporates a cap member 48 which extends across first inner circumferential surface 42. Cap member 48 also abuts the outer race of first bearing unit 30 and is maintained axially by means of a retaining ring 50. A seal 52 is interposed between cap member 48 and first inner circumferential surface 42 of first rotatable assembly 20. At the center of cap member 48, a coupling 54 is secured, which has a fluid passage 55 therethrough. The passage 55 of coupling 54 is in fluid communication with a conduit 56 of a rotary joint 58. Rotary joint 58 is mounted within a bore 60 formed in journal shaft 18 of support mount 12, and has an axial face 59A engaging an axial face 59B of the coupling 54 to define a rotary union therebetween. In general, rotary joint 58 takes the form of a cartridge that is known in the art. Conduit 56 is in further fluid communication with a passage 62 formed in journal shaft 18. Therefore, with this arrangement, a supply of pressurized fluid can be forced to selectively flow into journal shaft 18 and through cap member 48 via passage 62, conduit 56 and passage 55.

During the initial assembly of rotational control apparatus 10, first bearing unit 30 is initially positioned against shoulder 38 within first portion 22 of first rotatable assembly 20. Thereafter, first rotatable assembly 20 and first bearing unit 30 are slid axially onto journal shaft 18 of support mount 12 until first bearing unit 30 abuts shoulder 32. Rotary joint 58 is installed before or after the assembly of first rotatable assembly 20 and first bearing unit 30 upon support mount 12. Retainer element 34 is threaded onto the inner axial end 36 of the journal shaft 18. With seal 52 and coupling 54 attached to cap member 48, cap member 48 is slid along first inner circumferential surface 42 and pressed against the outer race of first bearing unit 30. Thereafter, retaining ring 50 is mounted in an annular groove formed in first inner circumferential surface 42 to axially retain cap member 48. With this arrangement, support mount 12 can be advantageously formed of one piece to enhance the structural characteristics thereof while still having journal shaft 18 extend well into first rotatable assembly 20. In one embodiment, the fluid passage 55 of coupling 54 is threaded for receipt of a bolt or the like to allow removal of cap member 48 (after removal of retaining ring 50) for disassembly.

In the embodiment shown in FIG. 1A, retainer element 34 is formed with a weep hole 64 and journal shaft 18 is provided with a weep passage 66 that extends from weep hole 64 axially through support mount 12. With this construction, if any leakage of pressurized fluid occurs at the rotary union between coupling 54 and rotary joint 58, the fluid will escape through the weep circuit (weep hole 64 and weep passage 66) and not through first bearing unit 30, thereby extending the useful life of bearing unit 30.

Rotational control apparatus 10 further includes a piston 68 having a disc-shaped portion defined, at least in part, by a first axial side surface 70 that is exposed to the pressurized fluid flowing through coupling 54. Piston 68 also includes a second axial side surface 72 from which project outer and inner axially extending portions 74 and 76. A seal 78 is interposed between outer axially extending portion 74 and second inner circumferential surface 44 of second portion 24 of first rotatable assembly 20. A fluid chamber 80 is defined between first rotatable assembly 20, cap member 48, and first axial side surface 70 of piston 68. The first rotatable assembly 20 is preferably formed of a low porosity metal such as steel or iron. As will be detailed further below, piston 68 is adapted to be selectively moved axially relative to first rotatable assembly 20 in order to engage and disengage rotational control apparatus 10.

In the embodiment shown in FIG. 1A, seal 78 is fixed to second portion 24 of first rotatable assembly 20. More specifically, an axially extending annular projection 82 of a reaction plate 84 captures seal 78 between first rotatable assembly 20 and reaction plate 84. Piston 68 is slidable along axial surfaces of projection 82, seal 78 and second portion 24 of first rotatable assembly 20.

Reaction plate 84 includes an outermost circumferential flange portion 86 that is adapted to be secured to second portion 24 of first rotatable assembly 20. Reaction plate 84 defines first engagement surface 46 of first rotatable assembly 20, which may be defined by a frictional lining comprised of a separate material. Reaction plate 84 also includes an inner, axially extending, annular portion 88 which aids in defining a plurality of annularly and axially extending cavities 92 in reaction plate 84. In the embodiment shown in FIG. 1A, twelve such cavities 92 are equally, annularly spaced in reaction plate 84 and the walls of cavities 92 define ribs (not shown), which structurally reinforce reaction plate 94. Each of the cavities 92 is adapted to receive a compression spring 94 which extends between reaction plate 84, its respective cavity floor 93 and second axial side surface 72 of piston 68.

Due to the presence of springs 94, piston 68 is biased proximally towards journal shaft 18, but fluid pressure delivered into fluid chamber 80 can cause piston 68 to move distally away from the journal shaft 18 and first rotatable assembly 20, against the biasing force of springs 94. During this axial movement, piston 68 also moves axially relative to reaction plate 84, with inner axially extending portion 76 of piston 68 being guided along inner axially extending portion 88 of reaction plate 84. Inner axially extending portion 76 of piston 68 is provided with seals 90, which contain lubricant to lubricate the interface between inner axially extending portion 76 of piston 68 and annular portion 88 of reaction plate 84 and prevent dust from entering that interface. In one form of the invention, an interface 95 between piston 68 and reaction plate 84 is provided with a friction reducing, thermal, spray applied, ceramic/metallic coating which is TEFLON impregnated.

Rotational control apparatus 10 also includes a second rotatable assembly 96, also known as a fan mounted friction disc (FMFD). Second rotatable assembly 96 is rotatably mounted to piston 68. FMFD 96 has a first, outer radial section 98 which is connected to a second, inner radial section 100. First outer radial section 98 has associated therewith a second engagement surface 102, which may be defined by a wear coating comprised of a separate material. Second engagement surface 102 is juxtaposed to first engagement surface 46 of first rotatable assembly 20. Outer radial section 98 is comprised of a first radial portion 98A and a second radial portion 98B. Second engagement surface 102 is integral to FMFD 96.

FMFD 96 is preferably formed of aluminum so as to be light-weight and easy to fabricate and machine, as well as for low inertia, low overall weight, and to be non-magnetic. Piston 68 and reaction plate 84 are also preferably formed of a light-weight non-magnetic material, such as aluminum.

Figure 2:
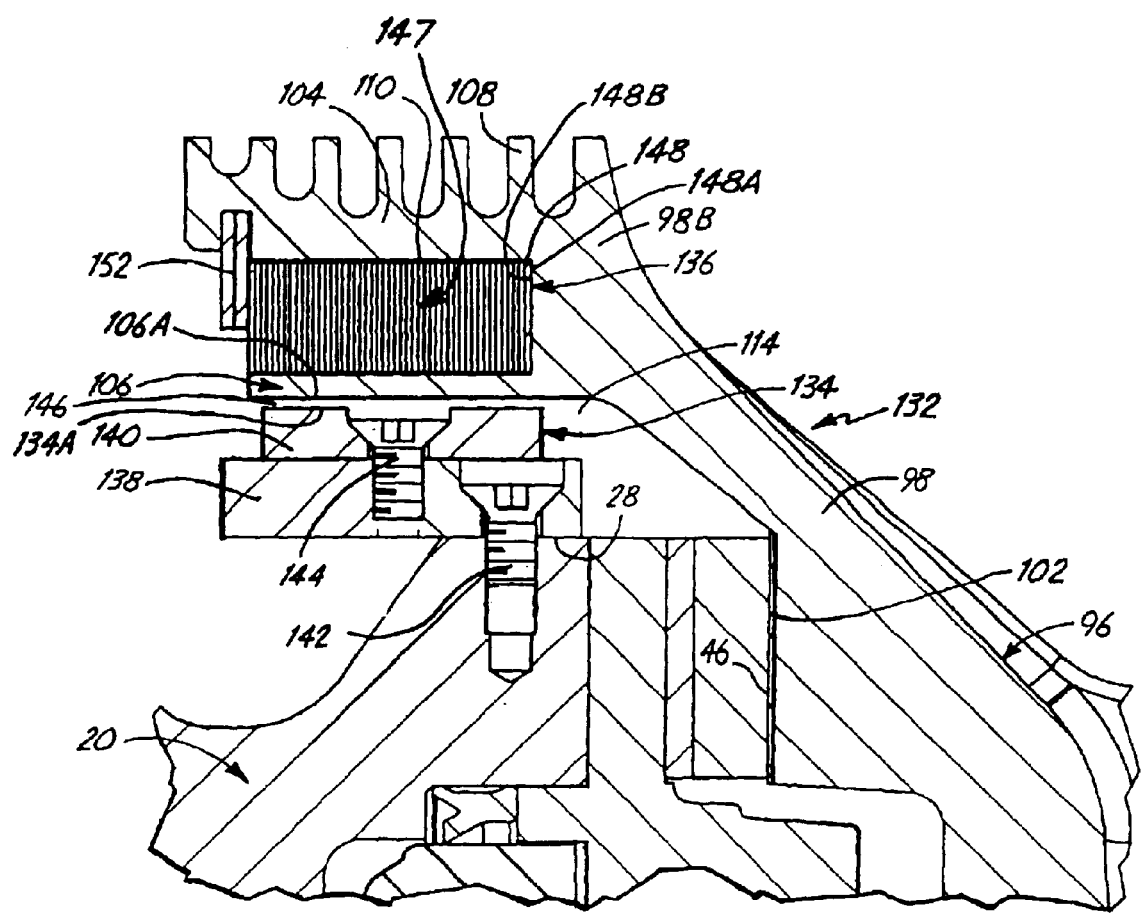
FIG. 2 shows a partial, cross-sectional view of the rotational control apparatus in a first, engaged position.

Second radial portion 98B of FMFD 96 has an outer radial portion 104 and an inner radial portion 106. Outer radial portion 104 of second radial portion 98B includes a plurality of cooling fins 108 which disperse heat generated by rotational control apparatus 10 during operation. The outer and inner radial portions 104 and 106 of second radial portion 98B define an inner annular cavity 110 therebetween. Inner surface 106A of inner radial portion 106 of FMFD 96 is juxtaposed in position adjacent to outer circumferential surface 28 of second portion 24 of first rotatable assembly 20, such that outer circumferential surface 28 and inner surface 106A are radially aligned with a gap 114 therebetween. As seen in FIG. 2, first and second friction engagement surfaces 46 and 102 are adapted to abut one another when rotational control apparatus 10 is in an engaged position (i.e., chamber 80 is not pressurized and piston 68 has not been moved), thereby frictionally engaging first rotatable assembly 20 and second rotatable assembly 96 for coupled rotation.

FMFD 96 is adapted to be mounted to piston 68 through the use of a shaft 116 having a head portion 118. More specifically, shaft 116 is constituted by a jack bolt having a torque fitting and is adapted to be received within a mounting hub 120 defined at a central portion of inner radial section 100 of FMFD 96. Mounting hub 120 is also provided with a shoulder 122 against which is positioned an inner race of a second bearing unit 124. Second bearing unit 124 has an outer race which is press fit against a thermal expansion controlling insert 126 cast integral with piston 68 (i.e., insert 126 defines inner axially extending portion 76) and abuts piston 68 in one axial direction, with the outer race being retained in its desired position by means of a snap ring 128.

During a subsequent stage of assembly of rotational control apparatus 10, piston 68 is inserted into second portion 24 of first rotatable assembly 20 and reaction plate 84, with springs 94 positioned within cavities 92, is secured to first rotatable assembly 20. With shaft 116 extending through second bearing unit 124, second bearing unit 124 is press fit within insert 126 and abuts piston 68. Thereafter, snap ring 128 is inserted to axially maintain the outer race of second bearing unit 124. Mainly due to the construction of reaction plate 84, it should be realized that second bearing unit 124 could be attached to piston 68 prior to the insertion of piston 68 within first rotatable assembly 20 as well. Next, mounting hub 120 is connected to second rotatable assembly 96 and is inserted within second bearing unit 124. Thereafter, torque is applied to shaft 116 to rotate the same and draw second rotatable assembly 96 into second bearing unit 124 until shoulder 122 abuts the inner race of second bearing unit 124. In tightening shaft 116 in mounting hub 120, head portion 118 engages the inner race of second bearing unit 124 such that the inner race is retained between head portion 118 and shoulder 122.

Due to this mounting arrangement and the presence of second bearing unit 124, piston 68 and second rotatable assembly 96 are permitted to rotate relative to one another. In addition, since second bearing unit 124 is located at an inner radial location, contaminants and dust will tend to flow radially outwardly and away from second bearing unit 124 due to centrifugal forces created during operation of rotational control apparatus 10. Also provided on second rotatable assembly 96, at inner radial section 100, are a plurality of annularly spaced shafts or studs 130 which are fixed to second rotatable assembly 96. Since rotational control apparatus 10, in the most preferred form of the invention, constitutes a frictional fan clutch, shafts 130 are adapted to receive a fan blade ring 131 with fan blades 131A thereon (shown in phantom in FIG. 1A).

When used as a clutch wherein both the first rotatable assembly 10 and second rotatable assembly 96 are permitted to rotate, springs 94 bias piston 68 into a position which causes engagement between first and second frictional engagement surfaces 46 and 102 (shown in FIG. 2). However, pressurized fluid can be introduced within fluid chamber 80 to cause axial movement of piston 68. Due to the interengagement between piston 68 and second rotatable assembly 96 through second bearing unit 124, axial movement of piston 68 relative to first rotatable assembly 20 will cause concurrent axial movement of second rotatable assembly 96. This axial movement of second rotatable assembly 96 will cause disengagement between first and second frictional engagement surfaces 46 and 102, thereby disengaging the frictional clutching operation of rotational control apparatus 10 (shown in FIG. 3).

It should be noted that first axial side surface 70 of piston 68 is disc-shaped, i.e., non-planar. This construction establishes a large piston area which is acted upon by the pressurized fluid introduced into fluid chamber 80. Therefore, the large piston area enables a high disengagement force to be developed within rotational control apparatus 10 for a given fluid pressure, while also allowing a large amount of spring force to cause rapid engagement with reduced slipping and wear.

When first rotatable assembly 20 and second rotatable assembly 96 are engaged, the transfer of rotational forces from one to the other occurs at the outer radial portions of rotational control apparatus 10. More specifically, these forces are directly transferred between first rotatable assembly 20 and second rotatable assembly 96 through first and second frictional engagement surfaces 46 and 102.

Figure 1B:
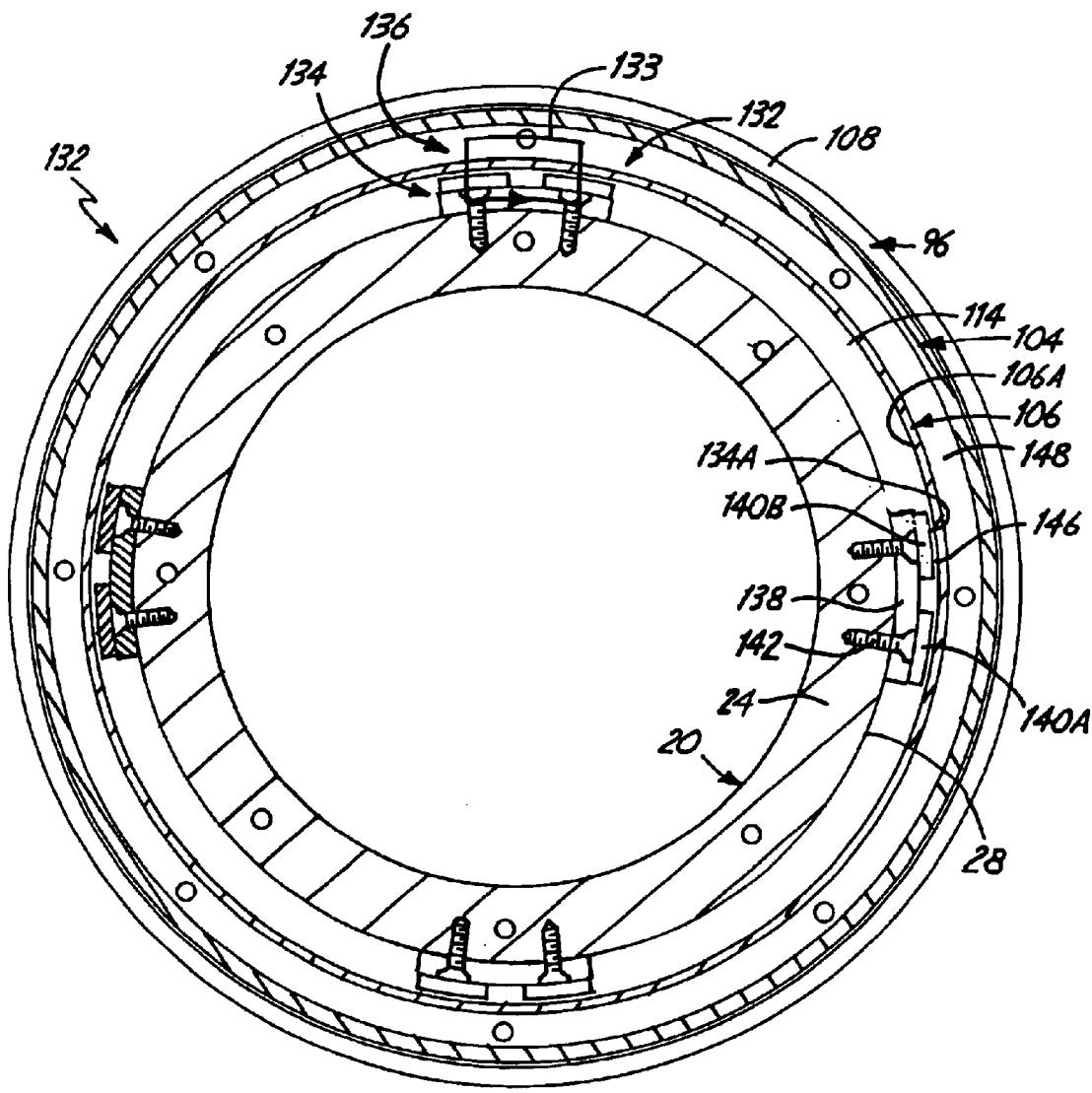
FIG. 1B is a schematic sectional view of the rotational control apparatus shown in FIG. 1A with, for clarity, some portions of the control apparatus not shown.
Figure 3:
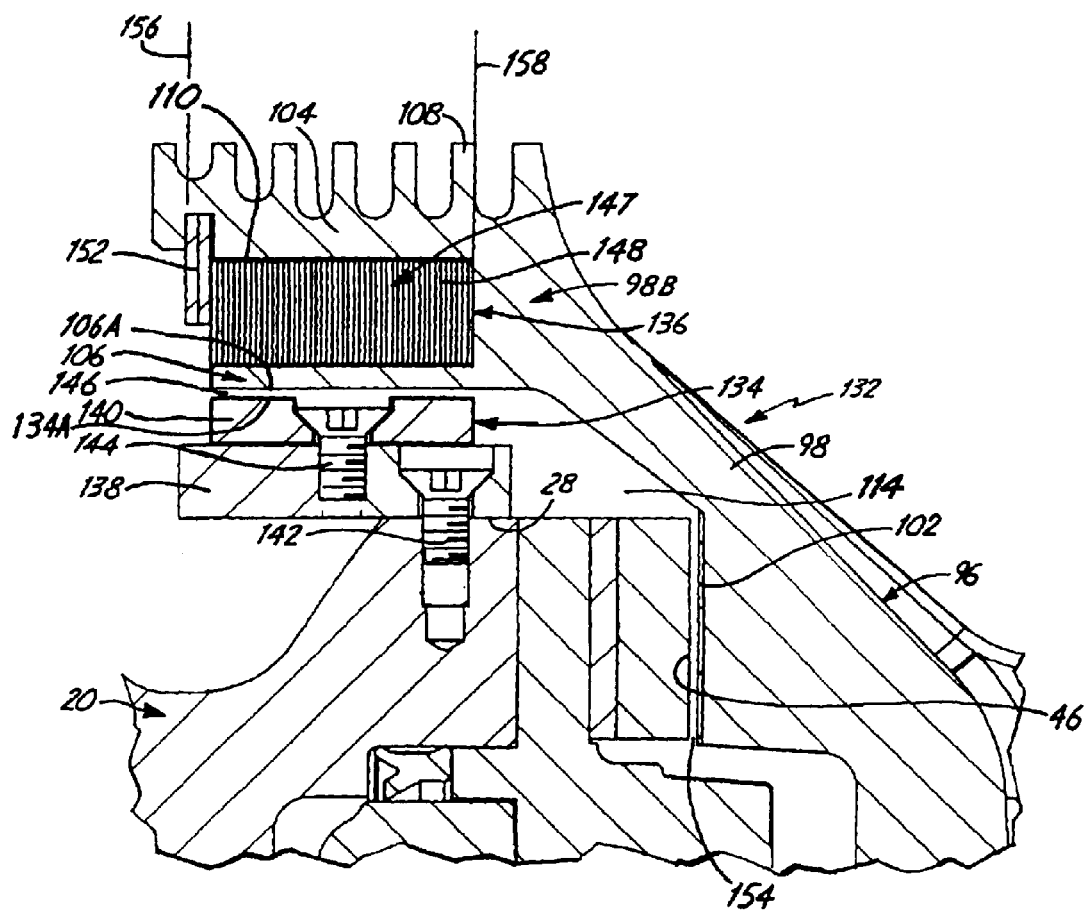
FIG. 3 shows a partial, cross-sectional view of the rotational control apparatus in a second, disengaged position.

The present invention incorporates an eddy current drive system 132 to drive second rotatable assembly 96 at an intermediate speed when the piston 68 is in a second, disengaged position, i.e. when first and second engagement surfaces 46 and 102 are disengaged. FIG. 1B is a schematic illustration of a section view of rotational control apparatus 10, and in particular, eddy current drive system 132. For clarity of illustration, central portion of the control apparatus 10 are not shown in FIG. 1B. FIG. 2 is a partial, cross sectional view of rotational control apparatus 10 in the first, engaged position, and FIG. 3 is a partial, cross-sectional view of rotational control apparatus 10 in the second, disengaged position.

Eddy current drive system 132 is comprised of a first eddy current coupling assembly 134 and a second eddy current coupling assembly 136. First eddy current assembly 134 is mounted to outer circumferential surface 28 of second portion 24 of first rotatable assembly 20, adjacent gap 114 between first rotatable assembly 20 and second rotatable assembly 96. First eddy current assembly 134 includes a plurality of back iron tabs 138 and a plurality of circumferentially spaced magnets 140 (i.e. magnets 140A and 140B in FIG. 1B). A pair of magnets 140 are secured to each back iron tab 138 and the magnets of the pair are spaced apart by about 14.7 degrees, although the distance could be more or less. Each pair of magnets 140 and their associated back iron tab 138 has a corresponding pair of magnets 140 secured to a back iron tab 138 circumferentially spaced 180 degrees therefrom. In the embodiment of first eddy current assembly 134 shown in FIG. 1B, there are four pairs of magnets 140 (for a total of eight magnets) attached to four back iron tabs 138.

Back iron tabs 138 are fixed relative to outer circumferential surface 28 of second portion 24 of first rotatable assembly 20 by a plurality of fasteners 142 that extend through back iron tab 138 and are received by second portion 24 of first rotatable assembly 20. Each magnet 140 is secured to back iron tab 138 by a fastener 144 which extends through magnet 140 and is received by back iron tab 138. An outer surface 134A of first eddy current assembly 134 is positioned within gap 114 between first and second rotatable assemblies 20 and 96 and is radially spaced apart from and aligned with inner surface 106A of inner radial portion 106 of second radial portion 98B of second rotatable assembly 96 such that a gap 146 is formed therebetween.

Second eddy current assembly 136 includes a laminated back iron 147, comprised of a stack of magnetically conductive electrically insulated steel rings 148, and inner radial portion 106 of second radial portion 98B of second rotatable assembly 96. The laminated back iron 147 includes insulated rings 148, which are stacked within annular cavity 110 defined between outer and inner radial portions 104, 106 of second radial portion 98B. Insulated rings 148 are stacked within annular cavity 110 perpendicular to an axis 21 of rotation of second rotatable assembly 96. In one embodiment, insulated rings 148 are comprised of steel to complete the flux loop, eliminate production of non-torque producing eddy currents, and increase the efficiency of eddy current drive 132.

As seen in FIGS. 2 and 3, each insulated ring 148 has a surface 148A and a surface 148B. An insulating coating is deposited on the axially spaced radial surfaces 1148A and 148B of each ring 148 to electrically insulate the ring 148 from adjacent rings 148. However, the insulating coating is not deposited along the radially extending circumferential edges of the ring. Each insulated ring 148 has a thickness between about 0.009 inches and about 0.019 inches and in one embodiment, has a thickness of about 0.018 inches. A retaining ring 152 maintains insulated rings 148 within annular cavity 110. Retaining ring 152 is mounted in an annular groove formed in outer radial portion 104 of second radial portion 98B.

Inner radial portion 106 of second radial portion 98B defines an intermediate ring of the second eddy current assembly 136. Inner radial portion 106 is comprised of a non-magnetic material such as aluminum, and is located adjacent first eddy current assembly 134 and the laminated back iron 147. However, in alternative embodiments of the present invention, the intermediate ring may be comprised of any non-magnetic material such as aluminum or copper. In one embodiment, the distance between first eddy current assembly 134 and second eddy current assembly, as defined by air gap 146 and inner radial portion 106, is about 0.060 inches.

When piston 68 is in the engaged position, first and second engagement surfaces 46 and 102 of first and second rotatable assemblies 20 and 96, respectfully, are engaged and abut each other. First and second eddy current assemblies 134 and 136 are radially spaced apart from each other by air gap 146 and are substantially axially aligned with each other (i.e., slightly offset axially, as seen in FIG. 2). In the engaged position, second rotatable assembly 96 (and fan blades 131A) is driven by frictional coupling with first rotatable assembly 20, and in particular sheave 26.

When piston 68 is in the second, disengaged position and first and second engagement faces 46 and 102 are disengaged, the first and second rotatable assemblies 20 and 96 are not frictionally coupled. However, eddy current drive 132 still causes second rotatable assembly 96 to rotate. Second rotatable assembly 96 moves axially with respect to first rotatable assembly 20 and first eddy current assembly 134. Because eddy current drive 132 is radially mounted, air gap 146 between first and second eddy current assemblies 134, 136 is maintained constant while allowing axial movement between the two eddy current assemblies. Thus, gap 146 between first eddy current assembly 134 and second eddy current assembly 136 remains fixed when first and second engagement surfaces 46 and 102 disengage.

In the piston disengaged position (shown in FIG. 3), first and second engagement surfaces 46 and 102 of first and second rotatable assemblies 20 and 96 are disengaged and do not abut each other (i.e., there is a gap 154 between surfaces 46 and 102). In the disengaged position, second rotatable assembly 96 is axially moved away from journal shaft 18 such that frictional engagement surfaces 46 and 102 are disengaged. Second eddy current coupling assembly 136 is thereby axially moved away from journal shaft 18. However, the axial dimensions of the first and second eddy current assemblies 134 and 136 are such that once moved, second eddy current assembly 136 is axially aligned with first eddy current coupling assembly 134 (i.e., their ends are aligned in radially extending planes 156 and 158, as seen in FIG. 3). In the disengaged position, second rotatable assembly 96, (and fan blades 131A connected thereto) is driven by eddy current drive system 132, which operates when second eddy current assembly 136 is moved axially with respect to first eddy current assembly 134 because the eddy current assemblies remain axially aligned.

When first and second engagement surfaces 46 and 102 are engaged (shown in FIG. 2), no eddy currents are produced and second rotatable assembly 96 (thereby shafts 130 and fan blades 131A) are driven by first rotatable assembly 20, in particular sheave 26. When first and second engagement surfaces 46 and 102 are in the disengaged position, second eddy current assembly 136, comprised of inner radial portion 106 and the stack of electrically insulated rings 148, rotates with second rotatable assembly 96 relative to piston 68. Because of this relative rotation, eddy currents are created in intermediate ring 106 of second eddy current assembly 136. The stack of electrically insulated rings 148 stops creation of non-torque producing eddy currents. However, torque producing eddy currents are still produced by eddy current drive 132.

The rings 148 have a thickness smaller than the eddy current diameter, thus, the larger diameter eddy currents cannot pass through the insulating coating of each ring 148, the small electric circuit (the eddy current) is broken and does not form. Each steel ring 148 contains all the magnetic flux and the insulating coating prevents the eddy current from jumping an air gap between each ring. Thus, the heat created by eddy current drive 132 is reduced and the magnetic flux only travels around the stack of electrically insulated rings 148. In addition, cooling fins 108 disperse the heat produced by the drive, thereby further reducing the amount of heat in the fan drive. In the disengaged position, eddy current drive 132 drives the fan, i.e., second rotatable assembly 96, at a second intermediate speed relative to first rotatable assembly 20.

The present invention uses the stack of electrically insulated rings 148 to eliminate non-torque producing eddy currents, while using a solid non-magnetic intermediate ring 106 to produce torque producing eddy currents. A magnetic field rotates with first eddy current assembly 134 in the radially arranged eddy current drive 132, relative to second eddy current assembly 136. Magnetic flux lines that produce torque producing eddy currents extend radially relative to the axis 21 and perpendicular to intermediate ring 106. An exemplary magnetic flux line 133 is shown in FIG. 1B. When the flux lines turn in the stack of electrically insulated rings 148 adjacent to intermediate ring 106, the flux lines are no longer perpendicular to intermediate ring 106 and do not create torque producing eddy currents because the stack of electrically insulated rings 148 stops creation of non-torque producing eddy currents.

In eddy current drive system 132 of the present invention, the magnetic flux line 133 leaves a first magnet 140A (one magnet of the set) in a radial direction perpendicular to the central axis, crosses air gap 146, continues radially through intermediate ring 106 and into the stack of electrically insulated rings 148 (which form a second back iron). The magnetic flux 133 is contained and turned circumferentially within each of the electrically insulated rings 148, then turns again to continue radially inwardly back through the intermediate ring 106, back across air gap 146 and into a magnet 140B spaced circumferentially from the first magnet 140A. Back iron tab 138 of first eddy current assembly 134 contains the magnetic flux 133 and completes the flux loop, by turning the flux circumferentially therein.

In the radial arrangement of eddy current drive 132, there is relative rotational movement between first eddy current assembly 134 (back iron tab 138 and magnets 140) and second eddy current assembly 136 (intermediate ring 106 and stack of electrically insulated rings 148). Therefore, there is a rotating magnetic field, which rotates with first eddy current assembly 134 and relative to the second eddy current assembly 136.

Whenever there is a magnetic field rotating relative to, or at a different velocity from, a magnetic or non-magnetic material, eddy currents are created in the magnetic and non-magnetic material perpendicular to the magnetic field lines. In the radial arrangement of eddy current drive 132 of the present invention, when the magnetic fields are perpendicular to intermediate ring 106, the eddy currents are tangent to intermediate ring 106 around the axis 21, and the eddy currents produce a torque about the axis 21. The flux lines that produce the torque producing eddy currents are perpendicular to the central axis and perpendicular to intermediate ring 106 in the radial arrangement. When the flux lines turn as in the stack of electrically insulated rings 148 they are no longer perpendicular to intermediate ring 106 and do not create torque producing eddy currents. In prior art eddy current assemblies having a solid back iron material adjacent to a non-magnetic intermediate ring, these non-torque producing eddy currents are still produced, but they are considered an inefficiency and precipitate themselves as heat. Non-torque producing eddy currents are avoided in the present invention by using the stack of electrically insulated rings 148 which eliminate the inefficient non-torque producing eddy currents and the associated heat.

Figure 4:
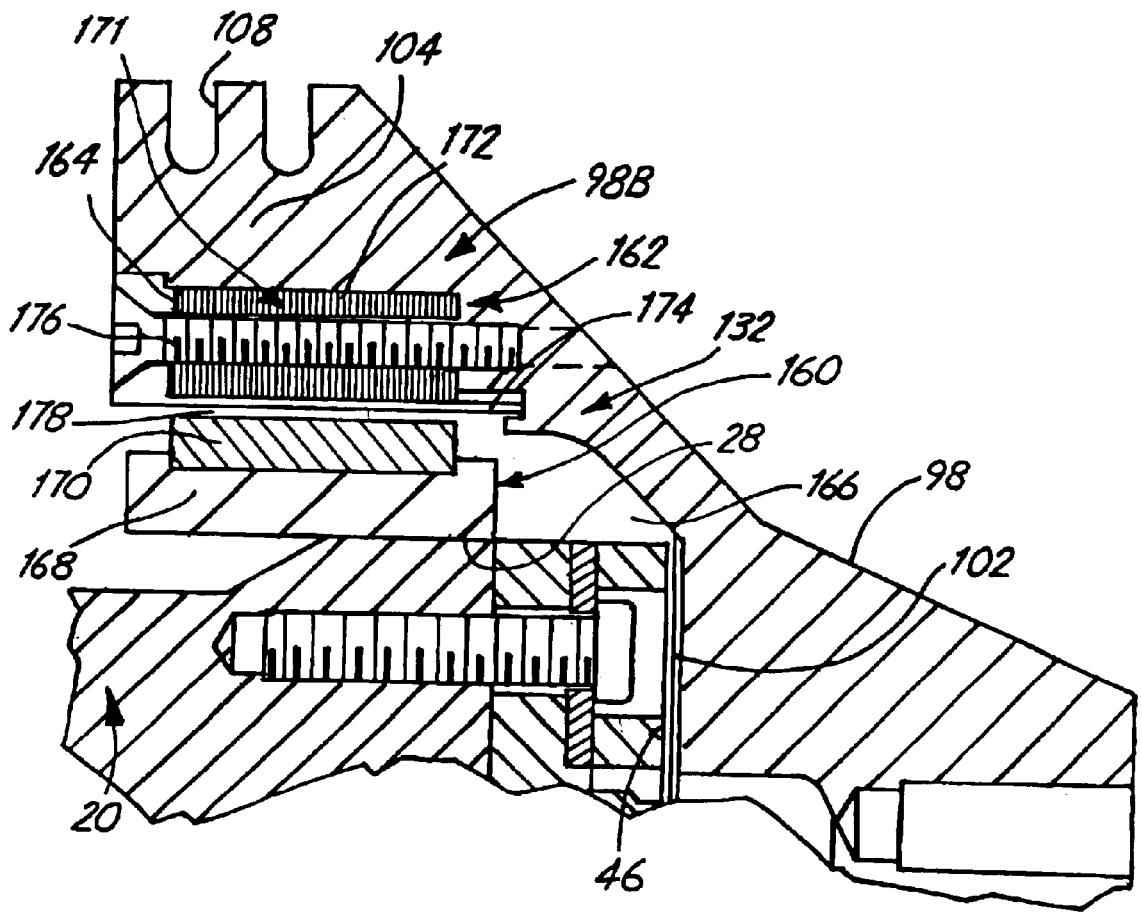
FIG. 4 shows a partial, cross-sectional view of the rotational control apparatus in accordance with a second embodiment of the present invention.

FIG. 4 is a partial cross sectional view of a second embodiment of rotational control apparatus 10. All of the features remain the same as the embodiment of FIGS. 1A–3 with the exception of the mounting of eddy current drive 132 within rotational control apparatus 10. Eddy current drive 132 of the second embodiment is comprised of a first eddy current coupling assembly 160 and a second eddy current coupling assembly 162. Second radial portion 98B of second rotatable assembly 96 includes an outer radial portion 104 which defines an inner cavity 164. First eddy current coupling assembly 160 is mounted and fixed relative to outer circumferential surface 28 of second portion 24 of first rotatable assembly 20, with a gap 166 formed between first and second rotatable assemblies 20 and 96. First eddy current assembly 160 is comprised of an annular band or back iron 168 fixed relative to outer circumferential surface 28 of second portion 24 of first rotatable assembly 20, and a plurality of annularly spaced magnets 170 secured to back iron 168. Inner cavity 164 is open on one side to gap 166.

Second eddy current assembly 162 includes a laminated back iron 171, comprised of a plurality of axially stacked electrically insulated steel rings 172, and an intermediate non-magnetic ring 174, which may be aluminum or copper. Insulated rings 172 are stacked within inner cavity 164 and held in place by a plurality of fasteners 172 which pass through the stack of insulated rings 172 and are received by lower outer radial section 98B of second rotatable assembly 96. Intermediate ring 174 is mounted to at least one of insulated rings 172 between first eddy current assembly 160 and insulated rings 172 with a air gap 178 defined between first and second eddy current assemblies 160 and 162. Rotational control apparatus 10 of the embodiment shown in FIG. 4 operates in the same manner as discussed above with respect to the embodiment shown in FIGS. 1A–3.

Although the present invention has been described with reference to preferred embodiments, workers skilled in the art will recognize that changes may be made in form and detail without departing from the spirit and scope of the invention.

What is claimed is:

1. A rotational control apparatus comprising:

a first assembly rotatably mounted to a first shaft of a first support mount;

a second assembly rotatably mounted to the first assembly, wherein the second assembly is axially moveable relative to the first assembly, the first and second assemblies having respective circumferential surfaces adjacent to and spaced from one another, the first and second assemblies further having respective radial surfaces that frictionally engage one another when the second assembly is in a first axial position, and the respective radial surfaces of the first and second assemblies disengage when the second assembly is in a second axial position, wherein the second assembly is capable of rotation independent of the first assembly when the second assembly is in the second axial position; and an eddy current drive comprised of a first eddy current coupling assembly and a second eddy current coupling assembly, the first eddy current coupling assembly associated with the circumferential surface of the first assembly and the second eddy current coupling assembly associated with the circumferential surface of the second assembly adjacent to and spaced from the first eddy current coupling assembly, wherein the second eddy current coupling assembly is adjacent the first eddy current coupling assembly with an air gap therebetween.

2. The rotational control apparatus of claim 1 wherein the second eddy current coupling assembly comprises:

a plurality of circumferential electrically insulated rings arranged in an inner cavity of the second assembly; and a circumferential non-magnetic ring radially positioned adjacent to the electrically insulated rings.

3. The rotational control apparatus of claim 1 wherein the first eddy current coupling assembly comprises:

a pair of back iron tabs attached to the circumferential surface of the first assembly, the back iron tabs spaced circumferentially apart and opposed therefrom; and a pair of magnets secured to each back iron tab.

4. A rotational control apparatus comprising:

a support mount having an axially extending shaft;

a first assembly rotatably mounted on the shaft, the first assembly being comprised of a first member and a second member together, the first member having an outer radial surface portion, an outer circumferential surface spaced from the outer radial surface portion, a first outer axial surface portion, and a second outer axial surface portion, wherein the outer radial surface portion is configured to engage a drive source, the outer circumferential surface comprises a first eddy current assembly, the first outer axial portion defines a cavity, and wherein the second member is mounted to the second axial surface portion of the first member, the second member comprising a first friction surface;

piston slidably mounted to the second member, the piston axially movable within the cavity between a first position and a second position, wherein the piston is biased toward the first position;

a third member rotatably mounted relative to the piston, the third member capable of rotational movement independent of the first assembly, the third member comprising an inner radial surface portion radially spaced from and coaxial to the outer circumferential surface of the first member, an annular cavity spaced from the inner radial surface wherein a second eddy current assembly is positioned in the annular cavity, the third member further comprising a second friction surface adjacent to the first friction surface of the second member, wherein the first and second friction surfaces engage one another when the piston is in the first position, and the first and second friction surfaces are spaced relative to one another when the piston is in the second position;

wherein the second eddy current assembly comprises:
a laminated back iron radially arranged in the annular cavity; and
a non-magnetic band connected to the laminated back iron, the non-magnetic band positioned between the laminated back iron and the first eddy current assembly.

5. The rotational control apparatus of claim 4 wherein each the laminated back iron comprises a plurality of electrically insulated magnetic bands stacked within the annular cavity, each magnetic including an insulating coating deposited on a top surface and a bottom surface of the magnetic band.

6. The rotational control apparatus of claim 5 wherein the plurality of bands comprise steel bands.

7. The rotational control apparatus of claim 5 wherein each band has a thickness of about 0.009 inches to about 0.019 inches.

8. The rotational control apparatus of claim 4 wherein the non-magnetic band is comprised of an aluminum or copper band.

9. The rotational control apparatus of claim 4 wherein the non-magnetic band and a spacing between the second eddy current assembly and the outer circumferential surface portion of the first member has a combined thickness of about 0.060 inches.

10. An improved rotational control apparatus including a support mount having a shaft, a first member and second member comprising a first rotatable assembly, wherein the first rotatable assembly is rotatably mounted to the shaft and the second member defines a cavity, a piston slidably mounted to the second member and axially movable within the cavity between a first position and a second position, and a third member rotatably mounted relative to the piston and capable of rotational movement independent of the first rotatable assembly, the improvement comprising:

a first eddy current assembly mounted to an outer circumferential surface of the first member; and a second eddy current assembly radially arranged within an inner cavity of the third member, the second eddy current radially spaced from and coaxial to the first eddy current assembly by a gap wherein the inner radial surface portion defines an inner cavity of the third member.

11. The improvement of claim 10 wherein the second eddy current assembly comprises:

a plurality of electrically insulated metal rings of magnetically conductive material radially arranged in the inner cavity of the third member adjacent the inner radial surface portion; and an intermediate ring of non-magnetic material connected to one of the insulated rings, the intermediate ring positioned between the plurality of insulated rings and the first eddy current assembly.

12. The improvement of claim 11 wherein each insulated metal ring comprises a top surface and a bottom surface, and an insulating coating is deposited on the top and bottom surfaces of the metal ring.

13. The improvement of claim 11 wherein the plurality of insulated metal rings are stacked in the inner cavity.

14. The improvement of claim 13, and further comprising a retaining ring to hold the insulated metal rings in the inner cavity.

15. The improvement of claim 10 wherein the first eddy current assembly comprises:

a pair of back iron tabs attached to the outer circumferential surface of the first member, the back iron tabs spaced circumferentially apart and opposed therefrom; and a pair of magnets secured to each back iron tab.

16. A rotational control apparatus comprising:

a support mount adapted to be maintained in a position fixed against rotation;

a first rotatable assembly including a first portion adapted to be interconnected to a driving source and a second portion axially spaced from the first portion, the second portion further including an outer circumferential surface;

a first bearing unit interposed between the support mount and the first rotatable assembly, with the first rotatable assembly being rotatably supported by the support mount through the first bearing unit;

a first engagement surface provided at the second portion of the first rotatable assembly for concurrent rotation with the first rotatable assembly;

a second rotatable assembly having first and second sections, the first section of the second rotatable assembly including a radially extending portion defining an inner radial surface portion aligned with the outer circumferential surface of the first rotatable assembly and the inner radial surface portion defining an inner cavity of the second rotatable assembly, the second section of the second rotatable assembly extending radially inwardly from the first section and being axially spaced from the first portion of the first rotatable assembly;

a second engagement surface provided at the first section of the second rotatable assembly;

a piston positioned axially between the first portion of the first rotatable assembly and the second section of the second rotatable assembly, with the piston being axially moveable relative to the first rotatable assembly;

means for axially moving the piston relative to the first rotatable assembly to cause selective engagement between the first and second engagement surfaces in order to interconnect the first and second rotatable assemblies;

a second bearing unit interconnecting the piston and the second rotatable assembly for concurrent axial movement relative to the first rotatable assembly while permitting relative rotation between the piston and the second rotatable assembly;

a first eddy current assembly radially mounted to the outer circumferential surface of the second portion of the first rotatable assembly;

a second eddy current assembly radially mounted in the inner cavity of the second rotatable assembly, the second eddy current assembly radially spaced from and coaxial to the first eddy current assembly;

wherein the second eddy current assembly comprises:
   a plurality of electrically insulated rings radially arranged in the inner cavity of the second rotatable assembly adjacent the inner radial surface portion; and
   an intermediate ring of non-magnetic material connected to one of the electrically insulated rings, the intermediate ring positioned between the plurality of electrically insulated rings and the first eddy current assembly.

17. The rotational control apparatus of claim 16 wherein each electrically insulated ring comprises a top surface and a bottom surface, and an insulating coating is deposited on the top and bottom surfaces of the electrically insulated ring.

18. The rotational control apparatus of claim 16 wherein the plurality of electrically insulated rings are stacked in the inner cavity.

19. The rotational control apparatus of claim 18, and further comprising a retaining ring to hold the electrically insulated rings in the inner cavity.

20. A cooling system for use in a vehicle, the cooling system comprising:
   a support mount including a journal shaft;
   a first assembly rotatably mounted to the shaft, the first assembly including a first engagement surface and having an inner cavity with a radially disposed outer wall;
   a piston positioned axially within the inner cavity wherein the piston is slidably movable with respect to the first assembly;
   a second assembly rotationally related to the piston, the second assembly having a radially disposed inner wall and a second engagement surface;
   a first eddy current coupling assembly radially mounted to the first assembly and disposed adjacent the second assembly; and
   a second eddy current coupling assembly radially mounted adjacent the inner wall of the second assembly wherein the second eddy current coupling assembly lies adjacent the first eddy current coupling assembly with an air gap therebetween, the second eddy current coupling assembly comprising:
      a plurality of electrically insulated rings radially arranged adjacent the inner wall of the second assembly; and
      an intermediate ring radially disposed between the electrically rings and the air gap; and
   means for axially moving the piston relative to the first assembly to cause selective engagement between the first and second engagement surfaces when the piston is axially moved to selectively interconnect the first and second assemblies.

21. The cooling system of claim 20 wherein the second assembly is slidable between a first position and a second position when the piston is axially moved.

22. The cooling system of claim 21 wherein the first and second engagement surfaces are engaged when the second assembly is in the first position.

23. The cooling system of claim 21 wherein the first and second engagement surfaces are disengaged when the second assembly is in the second position.

24. The cooling system of claim 21 wherein the first and second eddy current coupling assemblies comprise an eddy current drive which rotates the second assembly when the second assembly is in the second position.

25. The cooling system of claim 20 wherein the first eddy current coupling assembly is comprised of a back iron tab and a plurality of magnets, the back iron tab mounted to the first assembly and the plurality of magnets disposed adjacent the air gap.

26. The cooling system of claim 20 wherein each electrically insulated ring comprises an insulating coating deposited on a top surface and a bottom surface of the ring.

27. A rotational control apparatus comprising:
   a support mount including a shaft;
   a first rotational assembly rotatably mounted to the shaft, the first rotational assembly including a sheave adapted to be interconnected to a drive source, a sleeve housing axially spaced from the sheave, and a first engagement surface provided at the sleeve housing of the first rotational assembly;
   a first bearing unit interposed between the support mount and the first rotational assembly, with the first rotational assembly being rotatably mounted to the shaft through the first bearing unit;
   a second rotational assembly rotationally related to the piston, the second rotational assembly having an inner cavity with a radially disposed inner wall and a second engagement surface;
   a piston positioned axially between the first rotational assembly and the second rotational assembly, the piston including a radial portion and an inner axially extending portion with the sleeve housing of the first rotational assembly slidably supporting the axially extending portion of the piston such that the piston is axially movable relative to the first rotational assembly;
   at least one spring interposed between the sleeve housing and the radial portion of the piston;
   a second bearing unit interposed between the axially extending portion of the piston and the second rotational assembly, the second bearing unit interconnecting the piston and the second rotational assembly for permitting relative rotation between the piston and the second rotational assembly;
   means for axially moving the piston relative to the first rotational assembly to cause selective engagement between the first and second engagement surfaces when the piston is axially moved to selectively interconnect the first and second rotational assemblies and move the second rotational assembly between a first position and a second position;
   an eddy current drive comprised of a first eddy current coupling assembly and a second eddy current coupling assembly, the first eddy current coupling assembly associated with an outer circumferential surface of the first rotational assembly and the second eddy current coupling assembly associated with the second rotational assembly adjacent to and spaced from the first eddy current coupling assembly, wherein the second eddy current coupling assembly lies adjacent the first eddy current coupling assembly with an air gap therebetween, the second eddy current coupling assembly comprises:
      a plurality of coaxial insulated rings arranged in the inner cavity of the second rotational assembly adjacent the inner wall; and
   a non-magnetic ring coaxially positioned adjacent to the insulated rings;

wherein when the second rotational assembly is in the first position the first and second engagement surfaces are engaged such that the first and second rotational assemblies rotate with respect to the support mount at a first rotational speed; and wherein when the second rotational assembly is in the second position the first and second engagement surfaces are disengaged such that the first rotational assembly rotates with respect to the support mount and the eddy current drive rotates the second rotational assembly with respect to the piston at a second rotational speed.

28. The rotational control apparatus of claim 27 wherein the first eddy current coupling assembly is comprised of a pair back iron tabs with a pair of magnets attached to each back iron tab such that the magnets are disposed adjacent the air gap.

29. A rotational control apparatus for selectively interconnecting first and second relatively rotatable members, the rotational control apparatus comprising:

a support mount including a shaft, the support mount adapted to be maintained in a fixed position wherein the first rotatable member is rotatably mounted to the shaft;

a piston positioned axially between the first rotatable member and the second rotatable member wherein the second rotatable member is rotationally related to the piston, the piston being axially movable relative to the first rotatable member to cause selective interconnection between the first and second rotatable members and move the second rotatable member between a first position and a second position;

an eddy current drive comprised of a first eddy current coupling assembly and a second eddy current coupling assembly, the first eddy current coupling assembly associated with an outer circumferential surface of the first rotatable member and the second eddy current coupling assembly associated with the second rotatable member adjacent to and spaced from the first eddy current coupling assembly, wherein the second eddy current coupling assembly is adjacent the first eddy current coupling assembly with an air gap therebetween, the second eddy current coupling assembly comprises:

a plurality of coaxial insulated rings arranged in the inner cavity of the second rotatable member adjacent the inner wall; and a non-magnetic ring coaxially positioned adjacent to the insulated rings;

wherein when the second rotatable member is in the first position the first and second members are interconnected such that the first and second rotatable members rotate with respect to the support mount at a first rotational speed; and when the second rotatable member is in the second position the first and second rotatable members are not interconnected such that the first rotatable member rotates with respect to the support mount and the eddy current drive rotates the second rotatable member with respect to the piston at a second rotational speed.

* * * * *

UNITED STATES PATENT AND TRADEMARK OFFICE
CERTIFICATE OF CORRECTION

PATENT NO. : 6,838,796 B1
DATED : January 4, 2005
INVENTOR(S) : Chris A. Nelson

It is certified that error appears in the above-identified patent and that said Letters Patent is hereby corrected as shown below:

Column 9,
Line 15, delete "1148A", insert -- 148A --

Column 18,
Line 23, before "when", insert -- wherein --

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,838,796 C1  
APPLICATION NO. : 90/009247  
DATED : December 29, 2009  
INVENTOR(S) : Chris A. Nelson Page 1 of 1

It is certified that error appears in the above-identified patent and that said Letters Patent is hereby corrected as shown below:

Column 2, Line 31 of Ex Parte Reexamination Certificate, delete "appearance", insert --apparatus--

Signed and Sealed this

Sixteenth Day of February, 2010

David J. Kappos  
*Director of the United States Patent and Trademark Office*

(12) EX PARTE REEXAMINATION CERTIFICATE (7275th)
United States Patent
Nelson

(10) Number: US 6,838,796 C1
(45) Certificate Issued: Dec. 29, 2009

(54) TWO-SPEED ROTATIONAL CONTROL APPARATUS WITH EDDY CURRENT DRIVE

(75) Inventor: Chris A. Nelson, Bloomington, MN (US)

(73) Assignee: Horton, Inc., Roseville, MN (US)

Reexamination Request:
No. 90/009,247, Aug. 11, 2008

Reexamination Certificate for:
Patent No.: 6,838,796
Issued: Jan. 4, 2005
Appl. No.: 10/634,372
Filed: Aug. 5, 2003

Certificate of Correction issued Jul. 5, 2005.

(51) Int. Cl.
*H02K 49/04* (2006.01)

(52) U.S. Cl. .................... 310/105; 192/84.3
(58) Field of Classification Search .............. None
See application file for complete search history.

(56) References Cited

U.S. PATENT DOCUMENTS

| | | | |
|---|---|---|---|
| 726,536 A | 4/1903 | Holz | |
| 900,397 A | 10/1908 | Lange | |
| 1,136,279 A | 4/1915 | Severy | |
| 1,306,784 A | 6/1919 | Soames et al. | |
| 1,556,427 A | 10/1925 | Coughtry | |
| 1,742,804 A | 1/1930 | Carhart | |
| 1,742,805 A | 1/1930 | Carhart | |
| 1,827,348 A | 10/1931 | Bing | 74/339 |
| 1,935,581 A | 11/1933 | Snow, Jr. | |
| 2,221,014 A | 11/1940 | Williamson | |
| 2,232,454 A | 2/1941 | Haupt | |
| 2,241,242 A | 5/1941 | Friedman | |
| 2,437,871 A | 3/1948 | Wood | |
| 2,488,079 A | 11/1949 | Sensaud deLavaud et al. | |
| 2,519,449 A | 8/1950 | Findley | |
| 2,581,637 A | 1/1952 | Danly et al. | |
| 2,597,388 A | 5/1952 | Sensaud deLavaud | |
| 2,658,593 A | 11/1953 | Doebeli | |
| 2,661,148 A | 12/1953 | Englander | |
| 2,679,604 A | 5/1954 | Jaeschke | |
| 2,714,437 A | 8/1955 | Spase | |
| 2,732,921 A | 1/1956 | Rabinow | |
| 2,769,932 A | 11/1956 | Zozulin et al. | 310/105 |
| 2,902,612 A | 9/1959 | Whearley | |
| 2,937,803 A | 5/1960 | Cunningham | |
| 3,167,673 A | 1/1965 | Miguel et al. | |
| 3,209,184 A | 9/1965 | Woodward, Jr. | |
| 3,229,132 A | 1/1966 | Cohen et al. | |
| 3,291,273 A | 12/1966 | Hansen | |

(Continued)

FOREIGN PATENT DOCUMENTS

| | | |
|---|---|---|
| CH | 390375 A | 4/1965 |
| DE | 671285 | 2/1939 |
| DE | 1020242 | 11/1957 |
| DE | 1020243 | 11/1957 |

(Continued)

*Primary Examiner*—My-Trang Ton

(57) ABSTRACT

A rotational control apparatus includes a first rotatable assembly and a second rotatable assembly. The first assembly is rotatably mounted to a first support mount. The second assembly is rotatably mounted to the first assembly and is axially moveable relative to the first assembly. The first and second assemblies have respective coaxial surfaces adjacent to and spaced from one another and further have respective axial surfaces that frictionally engage one another when the second assembly is in a first axial position and disengage when the second assembly is in a second axial position. The second assembly is capable of rotation independent of the first assembly when the second assembly is in the second axial position. The rotational control apparatus includes an eddy current drive comprised of a first eddy current coupling assembly associated with the coaxial surface of the first assembly and a second eddy current coupling assembly associated with the coaxial surface of the second assembly, the second eddy current coupling assembly adjacent the first eddy current coupling assembly with an air gap therebetween.

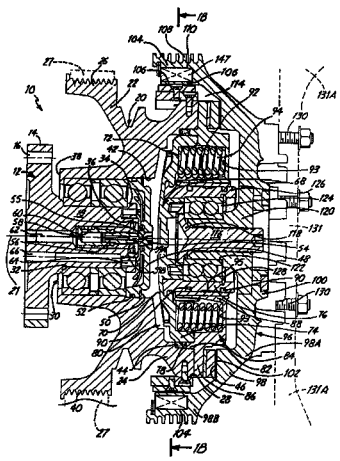

U.S. PATENT DOCUMENTS

| Patent No. | | Date | Inventor |
|---|---|---|---|
| 3,303,367 | A | 2/1967 | Jaeschke et al. |
| 3,353,641 | A | 11/1967 | Chana |
| 3,382,384 | A | 5/1968 | Hulls |
| 3,403,275 | A | 9/1968 | Little |
| 3,450,910 | A | 6/1969 | Jaeschke et al. |
| 3,456,141 | A | 7/1969 | Burgess |
| 3,458,122 | A | 7/1969 | Andriussi et al. ....... 416/170 R |
| 3,468,402 | A | 9/1969 | Edward |
| 3,478,239 | A | 11/1969 | Jaeschke |
| 3,488,535 | A | 1/1970 | Baermann |
| 3,488,536 | A | 1/1970 | Baermann |
| 3,566,168 | A | 2/1971 | Matsubara |
| 3,601,641 | A | 8/1971 | Baermann |
| 3,684,397 | A | 8/1972 | Elmer |
| 3,709,342 | A | 1/1973 | Spencer |
| 3,742,270 | A | 6/1973 | Jaeschke |
| 3,762,517 | A | 10/1973 | Hanks |
| 3,896,911 | A | 7/1975 | Beneke |
| 3,974,408 | A | 8/1976 | Fehr et al. |
| 4,094,393 | A | 6/1978 | Spokas |
| 4,138,618 | A | 2/1979 | Jaeschke |
| 4,139,085 | A | 2/1979 | Kanbe et al. |
| 4,226,095 | A | 10/1980 | Loken |
| 4,358,695 | A | 11/1982 | MacDonald et al. |
| 4,378,061 | A | 3/1983 | Schierling et al. |
| 4,379,242 | A | 4/1983 | MacDonald |
| 4,400,638 | A | 8/1983 | Albrecht et al. |
| 4,410,819 | A | 10/1983 | Kobayashi et al. |
| 4,418,807 | A | 12/1983 | Raines |
| 4,425,993 | A | 1/1984 | Schilling |
| 4,446,391 | A | 5/1984 | Sekine et al. |
| 4,456,110 | A | 6/1984 | Hanks et al. |
| 4,476,410 | A | 10/1984 | Wolcott |
| 4,488,627 | A | 12/1984 | Streich et al. |
| 4,498,066 | A | 2/1985 | Fujiwara et al. |
| 4,499,409 | A | 2/1985 | Bauer |
| 4,508,985 | A | 4/1985 | Pavlik et al. |
| 4,526,257 | A | 7/1985 | Mueller |
| 4,534,454 | A | 8/1985 | Brooks |
| 4,540,381 | A | 9/1985 | Molloy et al. |
| 4,555,239 | A | 11/1985 | Miranti |
| 4,564,775 | A | 1/1986 | Mazzorana |
| 4,576,266 | A | 3/1986 | Schilling et al. |
| 4,630,718 | A | 12/1986 | Hanks |
| 4,633,991 | A | 1/1987 | Hanks et al. |
| 4,648,493 | A | 3/1987 | Schilling et al. |
| 4,679,675 | A | 7/1987 | Hanks et al. |
| 4,683,392 | A | 7/1987 | MacDonald et al. |
| 4,688,951 | A | 8/1987 | Guers |
| 4,696,378 | A | 9/1987 | Brooks |
| 4,718,526 | A | 1/1988 | Koitabashi |
| 4,750,595 | A | 6/1988 | Dayen et al. |
| 4,766,986 | A | 8/1988 | Dayen et al. |
| 4,846,326 | A | 7/1989 | Tilton et al. |
| 4,857,785 | A | 8/1989 | McCarty |
| 4,877,117 | A | 10/1989 | Kniebel et al. |
| 4,907,683 | A | 3/1990 | Patel |
| 4,926,992 | A | 5/1990 | Linnig |
| 4,989,708 | A | 2/1991 | Gaggermeier |
| 4,997,074 | A | 3/1991 | Larson et al. |
| 5,052,988 | A | 10/1991 | Ishikawa et al. |
| 5,105,928 | A | 4/1992 | Saeki et al. |
| 5,219,050 | A | 6/1993 | Kubomiya |
| 5,226,517 | A | 7/1993 | Grochowski |
| 5,234,090 | A | 8/1993 | Haka |
| 5,238,095 | A | 8/1993 | Pedu |
| 5,284,230 | A | 2/1994 | Takaki |
| 5,301,779 | A | 4/1994 | Nash |
| 5,363,912 | A | 11/1994 | Wolcott |
| 5,586,635 | A | 12/1996 | Nelson et al. |
| 5,704,461 | A | 1/1998 | Vatsaas et al. |
| 5,947,248 | A | 9/1999 | Link |
| 6,013,003 | A | 1/2000 | Boffelli et al. .............. 475/149 |
| 6,092,638 | A | 7/2000 | Vatsaas ..................... 192/85 A |
| 6,098,771 | A | 8/2000 | Vu |
| 6,129,193 | A | 10/2000 | Link |
| 6,176,355 | B1 | 1/2001 | Yamamoto |
| 6,328,142 | B1 | 12/2001 | Kuwahara |
| 2002/0046915 | A1 | 4/2002 | Inoue et al. ................ 192/48.2 |

FOREIGN PATENT DOCUMENTS

| | | |
|---|---|---|
| DE | 1188191 | 3/1965 |
| DE | 1613060 | 1/1971 |
| DE | 2653459 | 6/1978 |
| DE | 2821973 | 11/1978 |
| DE | 3203143 A1 | 8/1983 |
| DE | 3443523 A1 | 6/1986 |
| DE | 3443524 A1 | 6/1986 |
| DE | 3915065 A1 | 11/1989 |
| DE | 4121240 A1 | 1/1993 |
| DE | 4207709 A1 | 9/1993 |
| DE | 4207710 A1 | 9/1993 |
| EP | 0202749 A1 | 11/1986 |
| FR | 2355205 | 1/1978 |
| FR | 2375494 | 7/1978 |
| GB | 1077724 | 8/1967 |
| GB | 1268444 A | 3/1972 |
| GB | 2054279 A | 2/1981 |
| JP | 59226721 A | 12/1984 |
| JP | 61130630 A | 6/1986 |
| WO | WO9622630 A1 | 7/1996 |
| WO | WO9847215 A1 | 10/1998 |

US 6,838,796 C1

EX PARTE
REEXAMINATION CERTIFICATE
ISSUED UNDER 35 U.S.C. 307

THE PATENT IS HEREBY AMENDED AS
INDICATED BELOW.

AS A RESULT OF REEXAMINATION, IT HAS BEEN DETERMINED THAT:

The patentability of claim 1 is confirmed.

New claims 30–49 are added and determined to be patentable.

Claims 2–29 were not reexamined.

30. The rotational control apparatus of claim 1, wherein the respective radial surfaces of the first and second assemblies define a friction clutch, and wherein the eddy current drive is operable to transmit torque between the first and second assemblies when the friction clutch is disengaged.

31. The rotational control apparatus of claim 1, wherein the respective radial surfaces of the first and second assemblies are substantially parallel to each other in both the first and second axial positions.

32. The rotational control apparatus of claim 1, wherein the rotational control apparatus is configured to provide two speed operation, with a first operational speed provided by frictional engagement of the respective radial surfaces of the first and second assemblies when the second assembly is in the first axial position, and with a second operational speed provided by the eddy current drive when the second assembly is in the second axial position.

33. The rotational control apparatus of claim 1, wherein the air gap between the first and second eddy current coupling assemblies remains substantially constant when the second assembly moves between the first axial position and the second axial position.

34. The rotational control apparatus of claim 1, wherein an axial spacing of the respective radial surfaces of the first and second assemblies increases when the second assembly moves from the first axial position to the second axial position.

35. The rotational control apparatus of claim 1, wherein an axial spacing of the respective radial surfaces of the first and second assemblies increases when the second assembly moves from the first axial positon to the second axial position, and wherein the air gap between the first and second eddy current coupling assemblies remains substantially constant when the second assembly moves between the first axial position and the second axial position.

36. The rotational control apparatus of claim 1, wherein the radial surface of the second assembly and the circumferential surface of the second assembly are both axially displaced by a substantially equal distance between the first axial position and the second axial position.

37. The rotational control apparatus of claim 1 and further comprising:
a plurality of cooling fins extending adjacent to the eddy current drive adjacent to a radially outer one of the circumferential surfaces.

38. The rotational control apparatus of claim 1 and further comprising:
a plurality of fan blades secured to the second assembly.

39. The rotational control apparatus of claim 1, wherein the eddy current drive comprises a plurality of permanent magnets secured to a radially inner one of the respective circumferential surfaces of the first and second eddy current coupling assemblies.

40. The rotational control apparatus of claim 1, wherein the second assembly includes a frusto-conical portion.

41. The rotational control apparatus of claim 1 and further comprising:
a friction material associated with one of the respective radial surfaces of the first and second assemblies.

42. The rotational control apparatus of claim 1 and further comprising:
means for providing a frictional engagement surface at an interface between the respective radial surfaces of the first and second assemblies.

43. The rotational control apparatus of claim 1, wherein the respective radial surfaces of the first and second assemblies each define an inner edge and an outer edge, the outer edge located radially outward from the inner edge irrespective of the relative axial positions of the inner and outer edges.

44. The rotational control apparatus of claim 1 and further comprising:
a fluid chamber adjacent to the second assembly, wherein the apparatus is configured to produce movement of the second assembly to the second axial position through introduction of pressurized fluid to the fluid chamber.

45. The rotational control apparatus of claim 44 and further comprising
a spring, wherein the movement of the second assembly produced by introduction of the pressurized fluid acts against a biasing force of the spring.

46. The rotational control appearance of claim 1 and further comprising:
a fluid chamber adjacent to the second assembly, where introduction of pressurized fluid to the fluid chamber produces movement of the second assembly to the second axial position;
a plurality of cooling fins extending adjacent to the eddy current drive adjacent to a radially outer one of the circumferential surfaces; and
a plurality of fan blades secured to the second assembly.

47. The rotational control apparatus of claim 1, wherein the rotational control apparatus is configured to provide two speed operation, wherein the respective radial surfaces of the first and second assemblies are substantially parallel to each other in both the first and second axial positions, and wherein the air gap between the first and second eddy current coupling assemblies remains substantially constant when the second assembly moves between the first axial position and the second axial position.

48. The rotational control apparatus of claim 1, wherein the air gap between the first and second eddy current coupling assemblies remains substantially constant when the second assembly moves between the first axial position and the second axial position, and wherein an axial spacing of the respective radial surfaces of the first and second assemblies increases when the second assembly moves from the first axial position to the second axial position, and further comprising:
means for moving the second assembly from the first axial position to the second axial position.

49. The rotational control apparatus of claim 1 and further comprising:
means for moving the second assembly from the first axial position to the second axial position.

* * * * *

US006838796C2

(12) INTER PARTES REEXAMINATION CERTIFICATE (0368th)
United States Patent
Nelson

(10) Number: US 6,838,796 C2
(45) Certificate Issued: Apr. 10, 2012

(54) TWO-SPEED ROTATIONAL CONTROL APPARATUS WITH EDDY CURRENT DRIVE

(75) Inventor: Chris A. Nelson, Bloomington, MN (US)

(73) Assignee: Horton, Inc., Roseville, MN (US)

Reexamination Request:
No. 95/001,250, Oct. 28, 2009

Reexamination Certificate for:
Patent No.: 6,838,796
Issued: Jan. 4, 2005
Appl. No.: 10/634,372
Filed: Aug. 5, 2003

Reexamination Certificate C1 6,838,796 issued Dec. 29, 2009

Certificate of Correction issued Jul. 5, 2005.

(51) Int. Cl.
*H02K 49/04* (2006.01)

(52) U.S. Cl. .................................. 310/105; 192/84.3
(58) Field of Classification Search ................. 310/105
See application file for complete search history.

(56) References Cited

To view the complete listing of prior art documents cited during the proceeding for Reexamination Control Number 95/001,250, please refer to the USPTO's public Patent Application Information Retrieval (PAIR) system under the Display References tab.

*Primary Examiner* — My-Trang Nu Ton

(57) ABSTRACT

A rotational control apparatus includes a first rotatable assembly and a second rotatable assembly. The first assembly is rotatably mounted to a first support mount. The second assembly is rotatably mounted to the first assembly and is axially moveable relative to the first assembly. The first and second assemblies have respective coaxial surfaces adjacent to and spaced from one another and further have respective axial surfaces that frictionally engage one another when the second assembly is in a first axial position and disengage when the second assembly is in a second axial position. The second assembly is capable of rotation independent of the first assembly when the second assembly is in the second axial position. The rotational control apparatus includes an eddy current drive comprised of a first eddy current coupling assembly associated with the coaxial surface of the first assembly and a second eddy current coupling assembly associated with the coaxial surface of the second assembly, the second eddy current coupling assembly adjacent the first eddy current coupling assembly with an air gap therebetween.

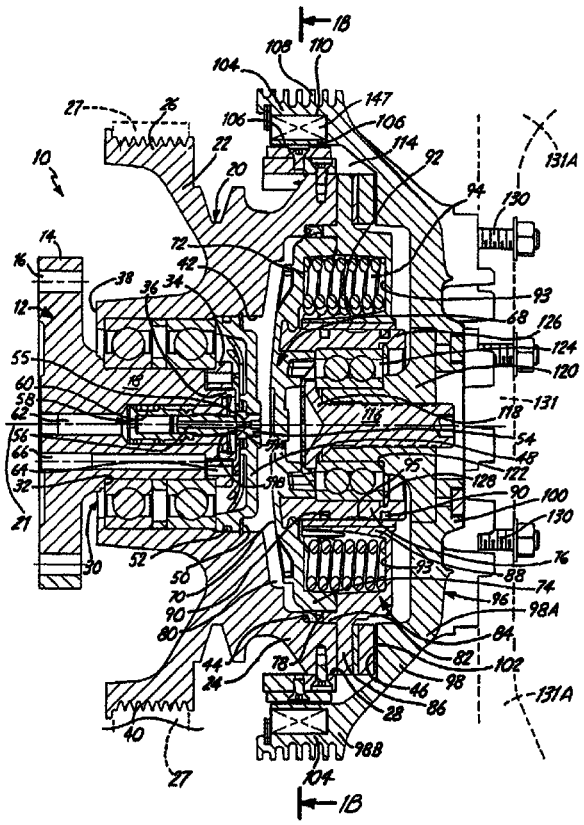

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1 and 30-49 is confirmed.
Claims 2-29 were not reexamined.

* * * * *